July 19, 1938.   D. ROSEN   2,124,448
HOOKLESS OR ZIPPER FASTENER
Filed Feb. 10, 1937   2 Sheets-Sheet 1

Inventor
DAVID ROSEN
By Paul, Paul & Moore
ATTORNEYS

July 19, 1938.    D. ROSEN    2,124,448
HOOKLESS OR ZIPPER FASTENER
Filed Feb. 10, 1937    2 Sheets-Sheet 2

Inventor
DAVID ROSEN
By [signature]
ATTORNEYS

Patented July 19, 1938

2,124,448

UNITED STATES PATENT OFFICE 2,124,448

HOOKLESS OR ZIPPER FASTENER

David Rosen, Minneapolis, Minn., assignor of one-half to Harry L. Davidson, Minneapolis, Minn.

Application February 10, 1937, Serial No. 125,061

5 Claims. (Cl. 24—205)

This invention relates to new and useful improvements in hookless fasteners commonly known to the trade as Zipper fasteners.

Zipper fasteners, as now commonly constructed, comprise two members having closely spaced interdigitating elements on the adjacent edges thereof adapted for interlocking engagement, and a slide for moving said elements into and out of interlocking engagement. Heretofore, no means has been provided in such fasteners, whereby the adjacent members thereof may be relatively adjusted longitudinally with respect to one another, and their use has therefore been more or less limited.

The present application concerns itself more particularly with the provision of a hookless fastener of the Zipper type, having means embodied in the construction thereof whereby the adjacent members of the fastener may be relatively adjusted lengthwise of the fastener, whereby the conventional type of Zipper fastener may be used in the construction of belts, and various other devices, or articles, requiring longitudinal adjustment.

An object of the present invention, therefore, is to provide a Zipper fastener having means embodied in the construction thereof, whereby the usual members of the fastener which are adapted for interlocking engagement, may be relatively adjusted lengthwise of the fastener, with the result that its field of use may be greatly extended.

A further and more specific object of the invention resides in the provision of a suitable guide at one end of one of the members of the fastener through which the interdigitated edge of the other of said members is slidably supported, and said guide having a socket at one end adapted to receive the usual slide of the Zipper fastener which, when received in said socket, will render the interdigitating elements of the two members of the fastener inoperative, so that the members may be longitudinally adjusted with respect to one another, and when the two members have been adjusted as desired, said slide may be moved out of said socket, whereby the elements of said members are again moved into interlocking engagement to secure together said members.

A further object is to provide a Zipper fastener having means embodied in the construction thereof, whereby the two members thereof may be relatively adjusted longitudinally, whereby the fastener readily lends itself for use in the construction of belts, and various types of garments such, for example, as maternity dresses, which require frequent adjustment of the waistline.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Figure 8:
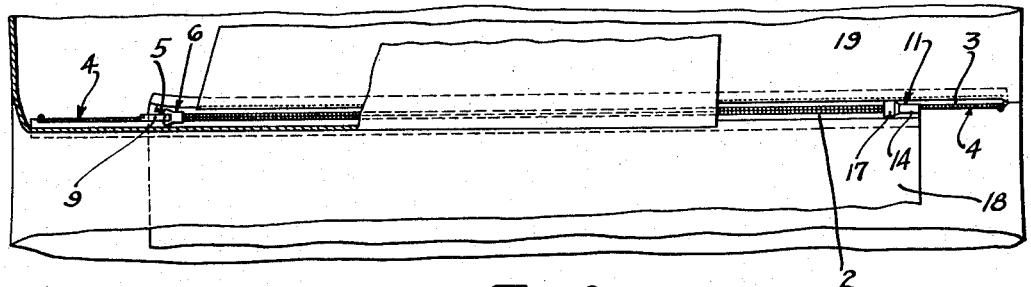
Figure 7:
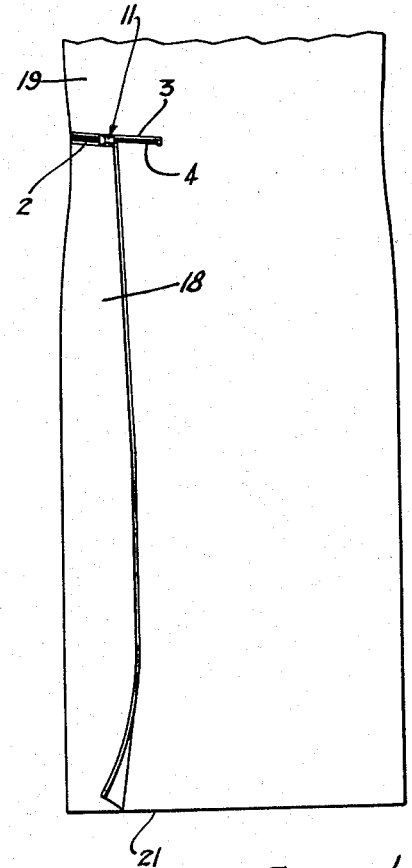

Figure 7 is a view showing the arrangement of the Zipper fastener in the garment, whereby the loose flap or skirt portion thereof is supported at the full length of its upper edge; and Figure 8 is a detail sectional view showing a portion of a garment with the novel Zipper fastener herein disclosed embodied in the construction of the waistline thereof, whereby the latter may readily be adjusted to the size of the figure.

In the selected embodiment of the invention here shown, there is illustrated in Figures 1 to 5, inclusive, a portion of a conventional Zipper fastener, comprising the usual members 2 and 3, having interdigitating hook-like elements, generally indicated by the numeral 4, provided upon the adjacent edges thereof, as is well-known in the art. The member 3 is shown provided at one end with the usual tongue 5 to facilitate operatively connecting together the two members.

Figure 4:
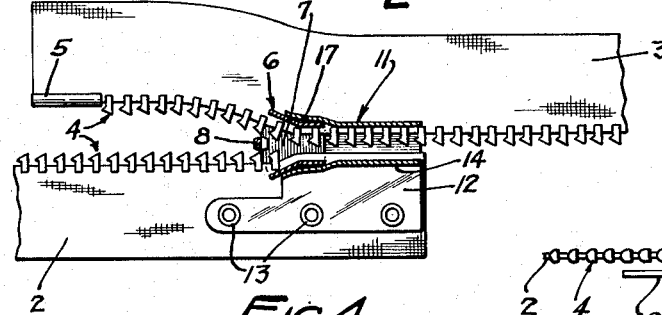
Figure 4 is a detail sectional view on a slightly larger scale, showing the slide positioned to hold the interdigitating elements of the two members of the fastener out of interlocking engagement, whereby said members may be longitudinally adjusted with respect to one another.
Figure 3:
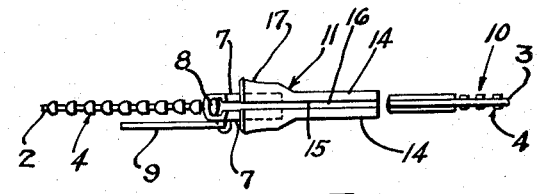
Figure 3 is a top view of Figure 1.
Figure 5:
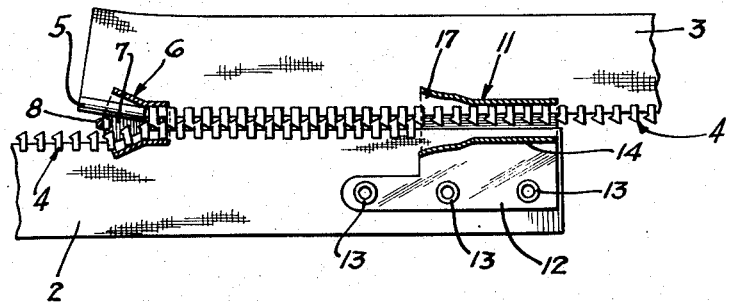
Figure 5 is a view similar to Figure 4, but showing the slide positioned to move the interdigitating elements into interlocking engagement.

A slide 6, of ordinary well-known construction, and comprising oppositely disposed walls 7—7, secured together in spaced relation by a cross member 8, is adapted to receive the elements 4 of the members 2 and 3, in the conventional way, and is adapted to move said elements into and out of interlocking engagement, as clearly illustrated in Figure 4. A small finger grip 9 is pivotally connected to a wall 7 of the slide, whereby the slide may be conveniently slid along the interdigitated edges of the members 2 and 3, thereby to move the elements 4 into and out of interlocking engagement.

An important feature of the present invention resides in the provision of means whereby the members 2 and 3 of the fastener may be longitudinally adjusted with respect to one another, thereby to vary the overall length of the fastener.

To thus longitudinally adjust the members 2 and 3 with respect to one another, a suitable guide, generally indicated by the numeral 11, is secured to one end of the member 2 of the fastener. In the present instance, the guide 11 is shown constructed of two opposed sections 12, which are suitably secured to the member 2 by such means as rivets 13, although they may be secured thereto in any other suitable manner desired.

Each section member 12 is provided at one edge with a channel-shaped portion 14, which portions face inwardly and cooperate to provide a guide for the interdigitated edge of the member 3 of the fastener. The edges 15 of the channel portions 14 are spaced apart to provide a gap 16 for receiving the member 3, as will readily be understood by reference to Figures 3, 4, and 5. The elements 4 project beyond the opposite sides of the member 3, as clearly illustrated at 10 in Figure 3, whereby the member 3 cannot become detached from the guide, unless it is moved in a longitudinal direction, as will be understood by reference to Figures 1 and 4.

Figure 1:
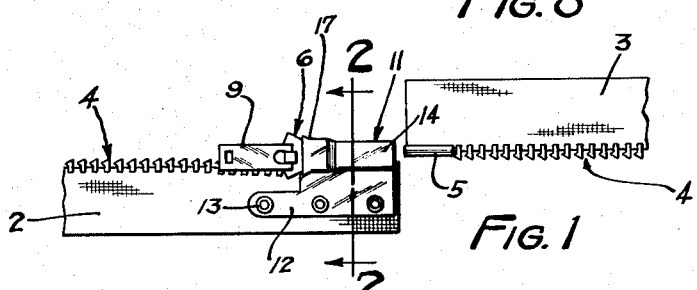
Figure 1 is a fragmentary view showing the two members of a conventional Zipper fastener with the invention embodied in the construction thereof.
Figure 2:
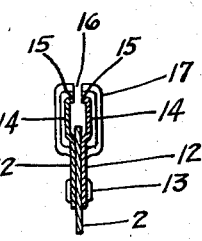
Figure 2 is a cross-sectional view on the line 2—2 of Figure 1.

The guide 11 is provided at one end with a socket 17 adapted to receive the slide 6, as shown in Figures 1 and 4, whereby the interdigitating elements 4 of the members 2 and 3 are moved out of interlocking engagement, thereby to permit free longitudinal movement of the member 3 with respect to the member 2. By referring to Figures 4 and 5, it will be noted that the elements 4 of the member 2 terminate short of the end of said member or, in other words, they do not extend into or beyond the socket 17 provided in the member 11. By thus terminating the elements 4 short of the end of the member 2, the elements 4 of the member 3 are completely disengaged from the elements 4 of the member 2, when the slide 6 is in the position shown in Figures 1 and 4. Thus, when the slide is so positioned, the members 2 and 3 may be longitudinally adjusted with respect to one another to any degree, varying from the spacing between adjacent elements 3 of the members 2 and 3 to substantially the entire length of said members.

Figure 6:
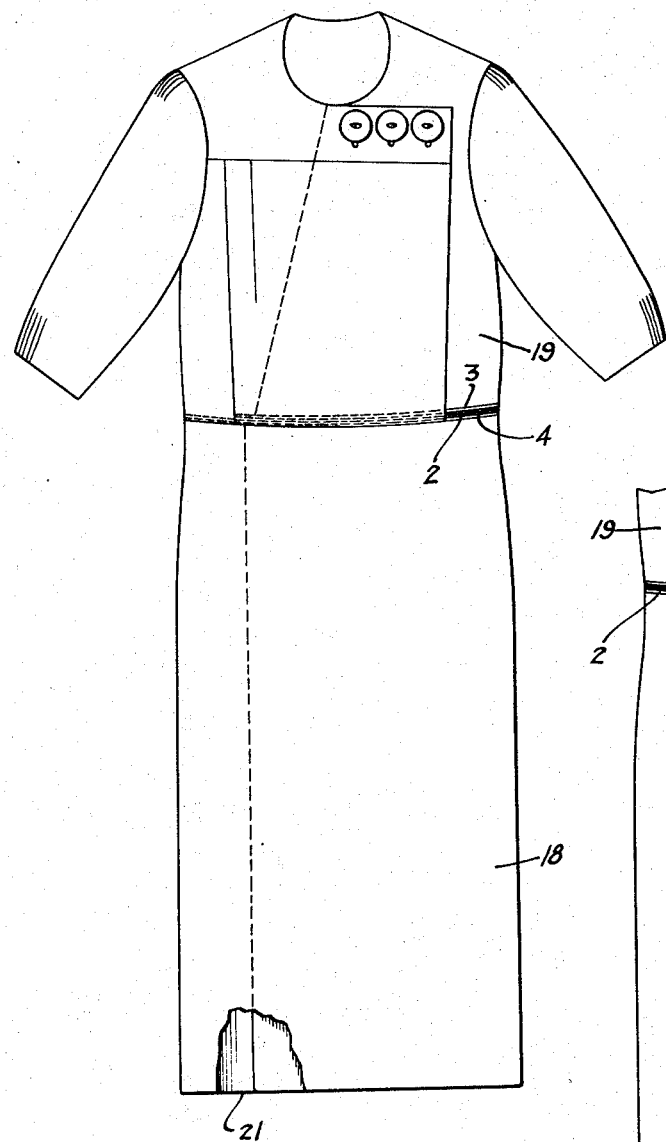
Figure 6 is a view showing the improved Zipper fastener embodied in the construction of a dress for relatively adjusting the waistline thereof.

In Figures 6 to 8, inclusive, the improved Zipper fastener is shown embodied in the construction of a garment, as for example, in the waistline of a maternity dress, whereby the waistline may readily be adjusted to any degree to fit the waistline of the figure. When thus used, the tape members 2 and 3 of the fastener are secured to the relatively adjustable parts of the garment as, for example, the lower skirt portion 18 and the waist portion 19, respectively.

By the employment of this novel Zipper in the construction of such a garment, the waistline may readily and conveniently be adjusted to suit the figure, by simply moving the slide 6 into the socket 17 of the guide 11, after which the parts 17 and 18 of the waistline of the garment may readily be relatively adjusted in a circumferential direction to increase or decrease the size of the waistline of the garment. Also, by securing together the parts 17 and 18 of the garment by the novel Zipper fastener herein disclosed, the upper edge of the skirt portion 18 is supported its entire length, whereby it cannot sag or droop below the lower edge 21 of the body of the garment, as will readily be understood by reference to Figures 7 and 8.

While I have herein illustrated the invention as embodied in the waistline of a garment, such as a dress, it is to be understood that it may be used for various other purposes where applicable. The invention, in its broadest scope, resides primarily in the provision of a hookless or Zipper fastener having means embodied in the construction thereof, whereby the adjacent members of such a fastener which are adapted to be interlockingly engaged with one another, may be longitudinally adjusted with respect to one another, whereby the overall length of the fastener, or the device or article with which the fastener is used, may be varied.

I claim as my invention:

1. The combination with a fastener comprising members having interdigitating elements and a slide for moving said elements into and out of interlocking engagement, of a guide secured to one end of one of said members for slidably supporting the interdigitating edge of the other of said members, and said guide having a socket at one end adapted to receive said slide, and means whereby when the slide is supported in said socket, the elements of said members are out of interlocking engagement, whereby the members may be relatively adjusted lengthwise of the fastener.

2. The combination with a fastener comprising members having interdigitating elements, and a slide for moving said elements into and out of interlocking engagement, of a guide secured to one end of one of said members and having a running connection with the interdigitating edge of the other of said members, and means whereby when the slide is moved into engagement with said guide, all of the elements of said members are out of interlocking engagement, whereby the members may be relatively adjusted lengthwise of the fastener.

3. The combination with a fastener comprising a pair of members having closely spaced interdigitating elements on the adjacent edges thereof adapted for interlocking engagement to secure together said members, and a slide for moving said elements into and out of interlocking engagement, of a guide secured to one end of one of said members beyond the interdigitating elements thereof, said guide slidably supporting the interdigitating edge of the other of said members, and means whereby when the slide is moved into engagement with the guide, all of the elements of said members are out of interlocking engagement, whereby the members may be relatively adjusted lengthwise of the fastener.

4. The combination with a fastener comprising a pair of members having interdigitating elements on the adjacent edges thereof adapted for interlocking engagement to secure together said members, and a slide for moving said elements into and out of interlocking engagement, of a guide secured to one of said members and having an elongated opening in a wall thereof for slidably receiving the other of said members, and whereby the interdigitating elements of the member which is slidably supported in said guide may pass freely through the guide, when the elements of said members are out of interlocking engagement, said guide having a socket at one end adapted to receive said slide, and means whereby when the slide is seated in said socket, all of the interdigitating elements of said members are out of interlocking engagement, whereby said members may be relatively adjusted lengthwise of the fastener.

5. In combination, a fastener comprising a pair of members carrying coacting rows of interdigitating elements and being capable of longitudinal adjustment relative to one another when the rows of elements are unlocked, a slider for locking and unlocking the interdigitating elements, a hollow guide element having both ends open fixed to one of the members at one end of its row of interdigitating elements, a slider confining and stop means carried by the guide element into engagement with which the slider is brought after the rows of interdigitating elements have been completely unlocked, the hollow guide element having a guide slot extending throughout the length thereof to permit the second member to be received therein and its interdigitating elements to slide through and beyond the guide element to different adjusted positions longitudinally of the first member, the slider being movable away from the stop means in any longitudinally adjusted position of the members to lock interdigitating elements of the two rows.

DAVID ROSEN.